(12) United States Patent
Chae et al.

(10) Patent No.: US 9,146,385 B2
(45) Date of Patent: Sep. 29, 2015

(54) LENS MODULE

(71) Applicant: SAMSUNG ELECTRO-MECHANICS CO., LTD., Suwon-si, Gyeonggi-do (KR)

(72) Inventors: Kyu-Min Chae, Suwon-si (KR); Il-Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/017,884

(22) Filed: Sep. 4, 2013

(65) Prior Publication Data

US 2014/0063617 A1    Mar. 6, 2014

(30) Foreign Application Priority Data

Sep. 5, 2012 (KR) .......... 10-2012-0098430
Jun. 26, 2013 (KR) .......... 10-2013-0073993

(51) Int. Cl.
*G02B 13/18* (2006.01)
*G02B 9/62* (2006.01)
(Continued)

(52) U.S. Cl.
CPC .............. *G02B 13/18* (2013.01); *G02B 13/004* (2013.01); *G02B 1/041* (2013.01); *G02B 3/04* (2013.01); *G02B 9/62* (2013.01); *G02B 9/64* (2013.01); *G02B 13/0015* (2013.01); *G02B 13/0045* (2013.01); *G02B 13/16* (2013.01)

(58) Field of Classification Search
CPC ...... G02B 13/0045; G02B 9/62; G02B 13/18; G02B 13/0015; G02B 3/04; G02B 13/16; G02B 1/041; G02B 9/64

USPC ................ 359/713, 715, 739, 740, 756, 757, 359/771–773
See application file for complete search history.

(56) References Cited

U.S. PATENT DOCUMENTS

2012/0194726 A1* 8/2012 Huang et al. ............... 359/713
2013/0033762 A1* 2/2013 Tsai et al. ................... 359/713

FOREIGN PATENT DOCUMENTS

CN    102621664 A    8/2012
CN    103676104 A    3/2014
(Continued)

OTHER PUBLICATIONS

Japanese Office Action issued in corresponding Japanese Application No. 2013-169848, dated Jul. 15, 2014, with English translation.
(Continued)

*Primary Examiner* — Evelyn A Lester
(74) *Attorney, Agent, or Firm* — NSIP Law

(57) ABSTRACT

A lens module is disclosed. A lens module in accordance with an embodiment of the present invention includes a first lens, a second lens, a third lens, and a fourth lens that are arranged successively in the direction from an object side to an imaging surface, wherein the first lens has a positive refractive index, the second lens a negative refractive index, the third lens a positive refractive index, and the fourth lens a negative refractive index, wherein the third lens includes a first sub-lens, a second sub-lens, and a third sub-lens that have a positive refractive index, wherein the fourth lens includes a center portion surrounding an optical axis and a peripheral portion surrounding the center portion, wherein the center portion on the imaging surface side is formed in a concave shape and the peripheral portion on the imaging surface side is formed in a convex shape.

13 Claims, 9 Drawing Sheets

(51) Int. Cl.
  *G02B 13/00* (2006.01)
  *G02B 13/16* (2006.01)
  *G02B 1/04* (2006.01)
  *G02B 9/64* (2006.01)
  *G02B 3/04* (2006.01)

(56) References Cited

FOREIGN PATENT DOCUMENTS

| | | |
|---|---|---|
| JP | 07-234361 A | 9/1995 |
| JP | 2001-124990 A | 5/2001 |
| JP | 2009-020182 A | 1/2009 |
| JP | 2010-224521 A | 10/2010 |
| JP | 2010-262270 A | 11/2010 |
| JP | 2012-008489 A | 1/2012 |
| JP | 2012-155223 A | 8/2012 |
| JP | 2014-026254 A | 2/2014 |
| JP | 2014-044373 A | 3/2014 |
| KR | 10-2011-0024872 A | 3/2011 |
| WO | 2011-129319 A1 | 10/2011 |
| WO | 2012-008357 A1 | 1/2012 |

OTHER PUBLICATIONS

Korean Notice of Allowance issued in corresponding Korean Application No. 10-2012-0098430, dated Jul. 30, 2014.
English Translation of Taiwanese Office Action issued in corresponding Taiwanese Application No. 102131591, dated Nov. 3, 2014.
Chinese Office Action issued on Jun. 1, 2015 from the Chinese State Intellectual Property Office, corresponding Chinese Patent Application No. 201310400435.0 (8 pages in English, 7 pages in Chinese).

* cited by examiner

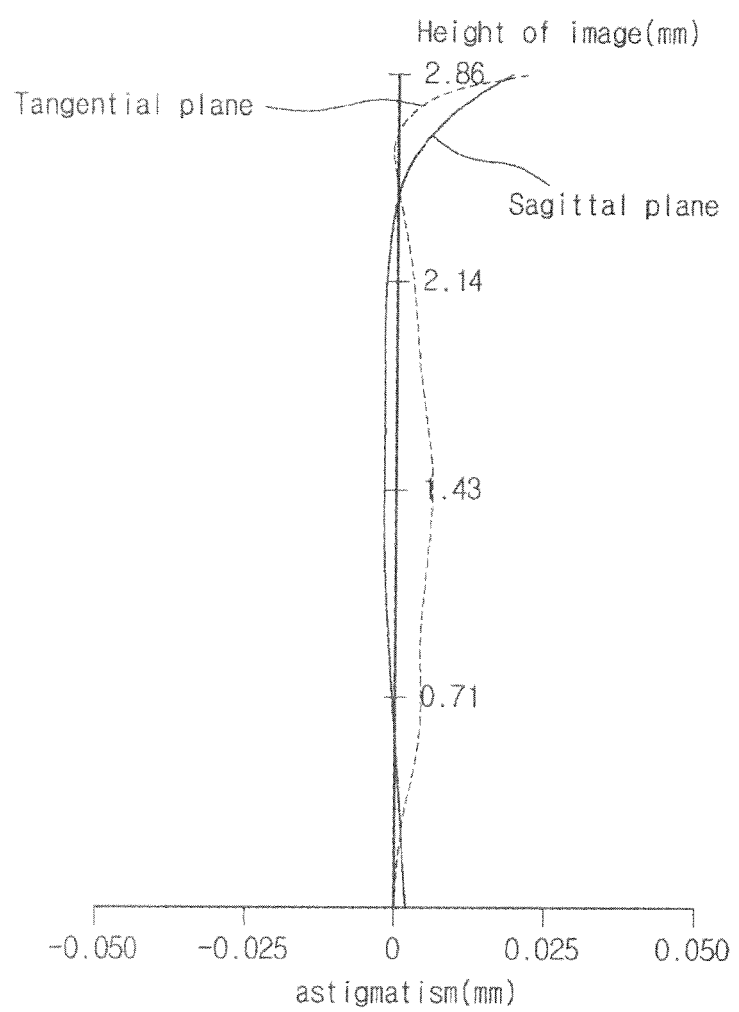

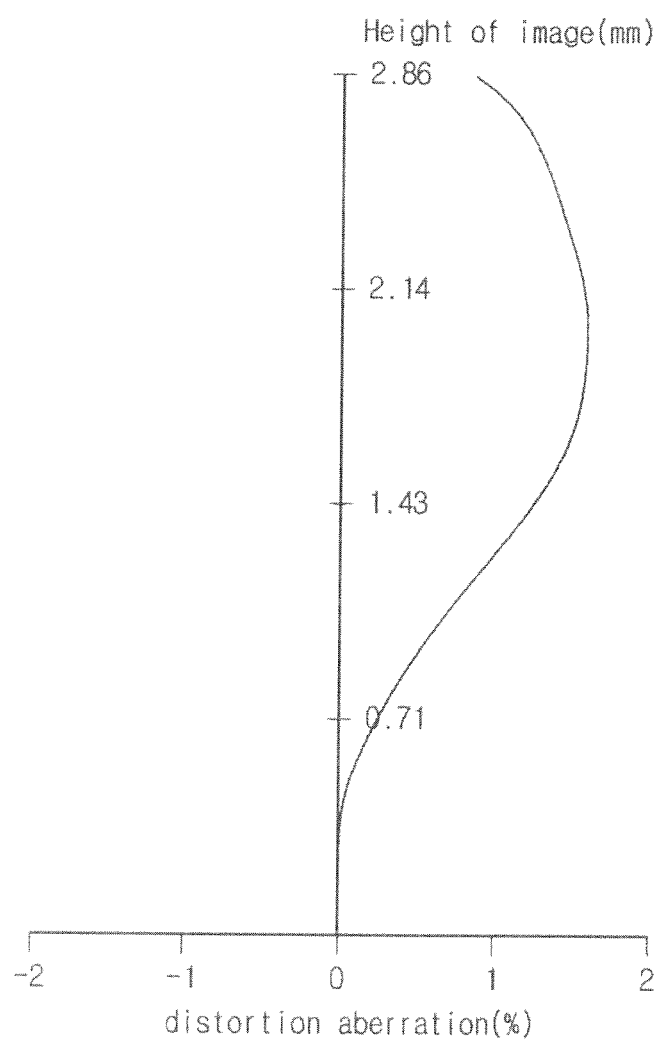

LENS MODULE

CROSS-REFERENCE TO RELATED APPLICATIONS

This application claims the benefit of Korean Patent Application Nos. 10-2012-0098430 and 10-2013-0073993, filed with the Korean Intellectual Property Office on Sep. 5, 2012 and Jun. 26, 2013, respectively, the disclosure of which is incorporated herein by reference in their entirety.

BACKGROUND

1. Technical Field

The present invention relates to a lens module.

2. Background Art

In the field of image pick-up system, there have been studies recently for developing camera modules for mobile terminals, digital still cameras, camcorders, PC cameras (i.e., image capturing device coupled to PC) and the like. The most important component for acquiring an image in the camera module in relation to the image pick-up system is a lens module having a plurality of lens installed therein for focusing the image.

In the case of a 8 M high-resolution camera, a 4-lens optical system is mainly used for a sensor having the pixel size greater than 1.4 μm, and a 5-lens optical system is used for a sensor having the pixel size of 1.12 μm.

In the 4-lens optical system, the first lens and the second lens are responsible for the entire refractive index of the optical system, and the third lens and the fourth lens are responsible for correcting a field curvature, a distortion, and an aberration that is not corrected by the first lens and the second lens. One of the first lens and the second lens is a Crown series lens, and the other is a Flint series lens to correct a longitudinal chromatic aberration. The second lens usually has a negative refractive index and is made of a flint material.

The most commonly used power arrangement for four lenses constituting the 4-lens optical system is generally a positive-negative-positive-negative arrangement from the first lens.

The 5-lens optical system is implemented by separating the second lens or the third lens of the 4-lens optical system to reduce the refractive angle of each lens and to optimize the performance of each field.

The related art of the present invention is disclosed in Korea Patent Publication No. 10-2012-0039075 (IMAGE PICKUP LENS, IMAGE PICKUP APPARATUS AND PORTABLE TERMINAL; laid open on Apr. 25, 2012).

SUMMARY

An aspect of the present invention features a lens module, which includes a first lens, a second lens, a third lens, and a fourth lens that are successively arranged in the direction from an object side to an imaging surface, wherein the first lens has a positive refractive index, the second lens a negative refractive index, the third lens a positive refractive index, and the fourth lens a negative refractive index, wherein the third lens includes a first sub-lens, a second sub-lens, and a third sub-lens that have a positive refractive index, wherein the fourth lens includes a center portion surrounding an optical axis and a peripheral portion surrounding the center portion, wherein the center portion on the imaging surface side is formed in a concave shape and the peripheral portion on the imaging surface side is formed in a convex shape.

Defining that an entire focal length of the lens module is f, and a composite focal length of the first sub-lens, the second sub-lens, and the third sub-lens is $f_3$, the lens module can satisfy $(f_3/f)<1.0$.

At least one of the first lens through the fourth lens has one or two aspheric surfaces.

BRIEF DESCRIPTION OF THE DRAWINGS

FIG. 8 is a graph showing astigmatism of the lens module according to the third embodiment of the present invention.

FIG. 9 is a graph showing distortion of the lens module according to the third embodiment of the present invention.

DETAILED DESCRIPTION

Figure 1:
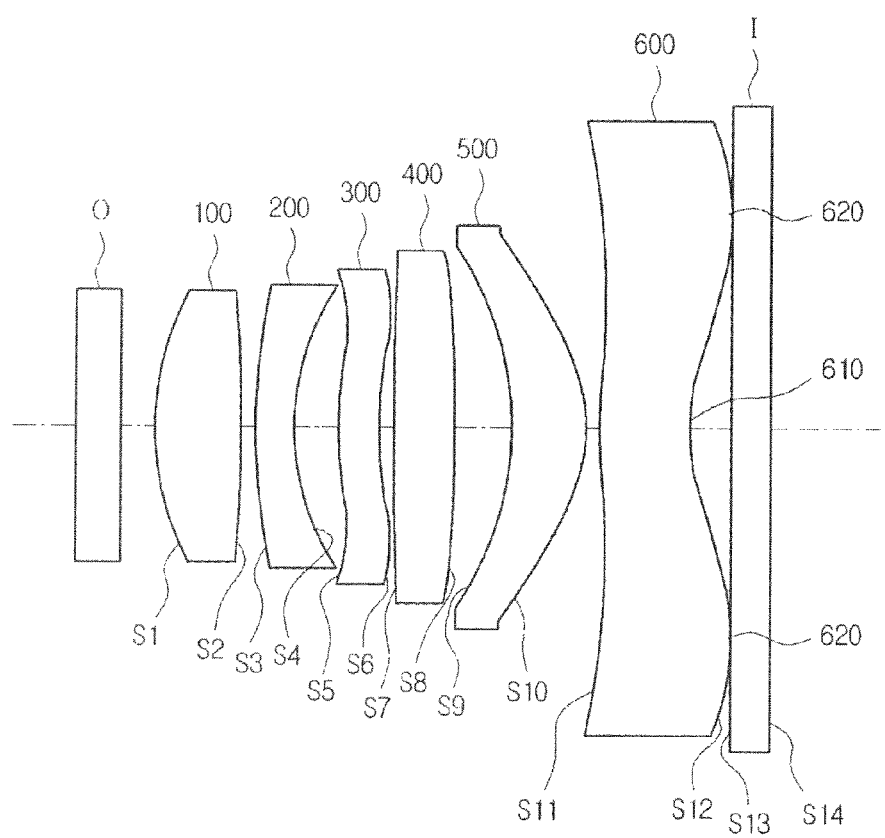
FIG. 1 is a brief illustration of a lens module according to a first embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention. Throughout the description of the present invention, when describing a certain relevant conventional technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Hereinafter, some embodiments will be described in detail with reference to the accompanying drawings. Identical or corresponding elements will be given the same reference numerals, regardless of the figure number, and any redundant description of the identical or corresponding elements will not be repeated.

As shown in FIG. 1, a lens module according to one embodiment of the present invention include a first lens 100, a second lens 200, a third lens, and a fourth lens 600 that are arranged from an object side (O) to an imaging surface (I). The third lens can be constituted with a first sub-lens 300, a second sub-lens 400, and a third sub-lens 500. The first lens 100 has a positive reflective index, the second lens 200 a negative reflective index, the third lens a positive reflective index, and the fourth lens 600 a negative reflective index. All of the first sub-lens 300 through the third sub-lens 500 constituting the third lens also have positive reflective indices.

The lens module according to one embodiment of the present invention is implemented to reduce an angle of refraction of each lens and to optimize the performance of each field by dividing the third lens. Accordingly, as shown in FIG. 1, the third lens is divided into the first sub-lens 300, the second sub-lens 400, and the third sub-lens 500. In order for the third lens to have a positive refractive index, each of the first sub-lens 300 through the third sub-lens 500 should be formed to have a positive refractive index. The third lens is divided into the first sub-lens 300 through the third sub-lens 500, and these sub-lenses are configured for correcting aberrations of center and peripheral rays. Dividing the third lens in the conventional 4-lens optical system into several lenses can be effective if the third lens has a big refractive index. In one embodiment of the present invention, the lens module is formed in such a way that the composite refractive index of the first sub-lens 300, the second sub-lens 400, and the third sub-lens 500 into which the third lens is divided is larger than the refractive index of the whole optical system.

As the refractive index of the lens module in accordance with the present invention is inversely proportional to a focal length, an overall focal length (f) of the lens module and a composite focal length ($f_3$) of the first sub-lens 300, the second sub-lens 400 and the third sub-lens 500 can be determined to satisfy the following Conditional Equation 1.

$(f_3/f)<1.0$     Conditional Equation 1

By satisfying the above Conditional Equation 1, the present invention can allow the third lens to take a sufficiently large portion of a converging power of the whole optical system and the other lenses to take a smaller portion of the converging power so as to lower a sensitivity of the whole optical system and secure the required performance.

In addition, the overall focal length (f) of the lens module of the present invention and a focal length ($f_1$) of the first lens 100 can be determined to satisfy the following Conditional Equation 2 in order for the first lens 100 to converge light.

$(f_1/f)<1.5$     Conditional Equation 2

Moreover, in the lens module according to one embodiment of the present invention, at least one of the first lens 100 through the fourth lens 600 can have one or two aspheric surfaces. As described above, by using a lens with one or two aspheric surfaces, it becomes possible to enhance a resolution of the lens module and allow the lens module to have good aberration characteristics.

As shown in FIG. 1, the fourth lens 600 can be constituted with a center portion 610 surrounding an optical axis and a peripheral portion 620 surrounding the center portion 610. The center portion 610 on the side of the imaging surface (I) is formed in a concave shape, and the peripheral portion 620 on the side of the imaging surface (I) is formed in a convex shape, thereby forming an inflection point at a location of connection between the center portion 610 and the peripheral portion 620. Specifically, when seen from the imaging surface (I), the center portion 610 is curved to cave in from the optical axis in an outward direction, and the peripheral portion 620 is curved to bulge out again at peripheral areas, forming the inflexion point in between the concave shape and the convex shape. The inflexion point that is formed on the fourth lens 600 can adjust a maximum angle of emergence of a principal ray that is incident at a light-receiving element to prevent a shading effect, by which peripheral areas of a screen become dark.

In addition, an Abbe value ($V_1$) of the first lens 100 and an Abbe value ($V_2$) of the second lens 200 can be determined to satisfy the following Conditional Equation 3 in order to correct a color aberration.

$20<V_1-V_2<60$     Conditional Equation 3

Moreover, proper ranges of $V_1$ and $V_2$ can be determined to satisfy the following Conditional Equation 4 in order to correct a color aberration.

$40<V_1<60$ and $20<V_2<30$     Conditional Equation 4

In one embodiment, a refractive index (n1) of the first lens 100 can be determined to satisfy the following Conditional Equation 5.

$1.50<n1<1.70$     Conditional Equation 5

Moreover, a refractive index (n2) of the second lens 200 can be determined to satisfy the following Conditional Equation 6.

$1.60<n2<1.80$     Conditional Equation 6

In other words, the second lens 200 can be made of a high refractive material so as to be advantageous for correcting the aberration.

Also, every lens of the lens module of the present invention, namely, the first lens 100, and the second lens 200, the third lens, and the fourth lens 600, can be made of plastic so as to save manufacturing cost and reduce a total weight of a camera.

In the lens module according to one embodiment of the present invention, the focal length ($f_1$) of the first lens 100 and the composite focal length ($f_3$) of the first sub-lens 300 through the third sub-lens 500 can be determined to satisfy the following Conditional Equation 7 in order to allow the third lens to take a sufficiently large portion of the converging power of the whole optical system and the first lens 100 to take a smaller portion of the converging power so as to lower the sensitivity of the whole optical system and secure the required performance.

$(f_1/f_3)>1.0$     Conditional Equation 7

In addition, a composite focal length ($f_{12}$) of the first lens 100 and the second lens 100 and the composite focal length ($f_3$) of the first sub-lens 300 through the third sub-lens 500 can be determined to satisfy the following Conditional Equation 8 for the same reason as Conditional Equation 7.

$(f_{12}/f_3)>2.0$     Conditional Equation 8

Also, defining a focal length of the fourth lens as $f_4$, a proper focal length of the third lens and the fourth lens 600 for correcting the aberration caused by the third lens can be determined to satisfy the following Conditional Equation 9.

$-2.0<(f_4/f_3)<-0.5$     Conditional Equation 9

Moreover, defining a focal distance of the second lens 200 as $f_2$, $f_1$ and $f_2$ can be determined to satisfy the following Conditional Equation 10 for aberration correction.

$-2.0 < (f_2/f_1) < -0.5$  Conditional Equation 10

Hereinafter, effects of the lens module according to some embodiments of the present invention will be described with reference to the below tables.

Table 1 and Table 2 show the specifications of spherical surfaces and aspheric coefficients according to the first embodiment, Table 3 and Table 4 the specifications of spherical surfaces and aspheric coefficients according to a second embodiment, and Table 5 and Table 6 the specifications of spherical surfaces and aspheric coefficients according to a third embodiment.

Embodiment 1

TABLE 1

Specifications of Spherical Surfaces

| Surface No. | Radius of curvature, R (mm) | Thickness (mm) | Refractive index | Abbe value |
|---|---|---|---|---|
| S1  | 2.025   | 0.674 | 1.546 | 56.1 |
| S2  | -25.778 | 0.113 |       |      |
| S3  | 4.313   | 0.300 | 1.638 | 23.4 |
| S4  | 1.674   | 2.247 |       |      |
| S5  | 3.160   | 0.326 | 1.638 | 23.4 |
| S6  | 3.269   | 0.100 |       |      |
| S7  | 12.177  | 0.473 | 1.546 | 56.1 |
| S8  | -18.489 | 0.426 |       |      |
| S9  | -2.199  | 0.596 | 1.546 | 56.1 |
| S10 | -0.993  | 0.100 |       |      |
| S11 | 5.730   | 0.689 | 1.546 | 56.1 |
| S12 | 1.172   | 0.335 |       |      |
| S13 | 0.000   | 0.300 | 1.517 | 64.1 |
| S14 | 0.000   | 0.847 |       |      |

TABLE 2

Aspheric coefficients

|    | K       | A        | B       | C       | D       | E        | F | G |
|----|---------|----------|---------|---------|---------|----------|---|---|
| 1  | 0.0000  | -0.0053  | -0.0092 |  0.0093 | -0.0110 | —        | — | — |
| 2  | 0.0000  | -0.0587  |  0.1333 | -0.1503 |  0.0510 | —        | — | — |
| 3  | 0.0000  | -0.1641  |  0.3356 | -0.3475 |  0.1506 | -0.01347 | — | — |
| 4  | 0.0000  | -0.1833  |  0.2803 | -0.2369 |  0.0799 | —        | — | — |
| 5  | 0.0000  | -0.1051  | -0.0099 |  0.0141 | -0.0119 | —        | — | — |
| 6  | 0.0000  | -0.0768  | -0.0194 |  0.0073 | -0.0014 | —        | — | — |
| 7  | 0.0000  | -0.0518  |  0.0352 | -0.0034 | -0.0020 | —        | — | — |
| 8  | 0.0000  | -0.0382  |  0.0388 | -0.0125 | -0.0008 | —        | — | — |
| 9  | -4.5602 | -0.0453  |  0.0628 | -0.0340 |  0.0083 | -0.0019  | — | — |
| 10 | -3.3101 | -0.0877  |  0.0718 | -0.0309 |  0.0107 | -0.0016  | — | — |
| 11 | 0.0000  | -0.0438  | -0.0009 |  0.0037 | -0.0007 |  0.0001  | — | — |
| 12 | -6.5277 | -0.03947 |  0.0086 | -0.0018 |  0.0002 | —        | — | — |

Embodiment 2

TABLE 3

Specifications of Spherical Surfaces

| Surface No. | Radius of curvature, R (mm) | Thickness (mm) | Refractive index | Abbe value |
|---|---|---|---|---|
| S1  | 1.97    | 0.666 | 1.5465 | 56.1 |
| S2  | -12.393 | 0.109 |        |      |
| S3  | 4.752   | 0.321 | 1.639  | 23.4 |
| S4  | 1.74    | 0.336 |        |      |
| S5  | -28.594 | 0.3   | 1.5465 | 56.1 |
| S6  | -14.862 | 0.07  |        |      |
| S7  | 8.512   | 0.439 | 1.5465 | 56.1 |
| S8  | 13.148  | 0.445 |        |      |
| S9  | -2.455  | 0.748 | 1.5465 | 56.1 |
| S10 | -0.912  | 0.1   |        |      |
| S11 | 6.558   | 0.575 | 1.5465 | 56.1 |
| S12 | 1.017   | 0.34  |        |      |
| S13 | 0.000   | 0.300 | 1.517  | 64.1 |

TABLE 4

Aspheric coefficients

|    | K      | A      | B      | C      | D      | E      | F | G |
|----|--------|--------|--------|--------|--------|--------|---|---|
| 1  |  0     | -0.001 | -0.016 |  0.02  | -0.017 | —      | — | — |
| 2  |  0     | -0.049 |  0.142 | -0.164 |  0.054 | —      | — | — |
| 3  |  0     | -0.172 |  0.352 | -0.36  |  0.147 | -0.01  | — | — |
| 4  |  0     | -0.191 |  0.296 | -0.24  |  0.081 | —      | — | — |
| 5  |  0     | -0.071 |  0.064 | -0.007 | -0.015 | —      | — | — |
| 6  |  0     | -0.029 |  0.042 | -0.019 | -0.001 | —      | — | — |
| 7  |  0     | -0.046 | -0.008 |  0     |  0.001 | —      | — | — |
| 8  |  0     | -0.031 | -0.004 | -0.004 |  0     | —      | — | — |
| 9  | -6.575 | -0.05  |  0.05  | -0.034 |  0.011 | -0.002 | — | — |
| 10 | -3.544 | -0.097 |  0.064 | -0.032 |  0.011 | -0.001 | — | — |
| 11 |  0     | -0.044 | -0.003 |  0.004 | -0.001 | —      | — | — |
| 12 | -6.28  | -0.043 |  0.009 | -0.002 |  0     | —      | — | — |

Embodiment 3

TABLE 5

Specifications of Spherical Surfaces

| Surface No. | Radius of curvature, R (mm) | Thickness (mm) | Refractive index | Abbe value |
|---|---|---|---|---|
| S1 | 1.945    | 0.712 | 1.546  | 56.1 |
| S2 | -11.133  | 0.108 |        |      |
| S3 | 5.393    | 0.313 | 1.639  | 23.4 |
| S4 | 1.796    | 0.355 |        |      |
| S5 | -192.752 | 0.395 | 1.5465 | 56.1 |

TABLE 5-continued

Specifications of Spherical Surfaces

| Surface No. | Radius of curvature, R (mm) | Thickness (mm) | Refractive index | Abbe value |
|---|---|---|---|---|
| S6 | −5.285 | 0.115 | | |
| S7 | −5.196 | 0.315 | 1.5465 | 56.1 |
| S8 | −15.612 | 0.323 | | |
| S9 | −2.895 | 0.866 | 1.5465 | 56.1 |
| S10 | −0.92 | 0.1 | | |
| S11 | 8.644 | 0.575 | 1.5465 | 56.1 |
| S12 | 1.007 | 0.355 | | |
| S13 | 0.000 | 0.300 | 1.517 | 64.1 |
| S14 | 0.000 | 0.85 | | |

TABLE 6

Aspheric coefficients

| | K | A | B | C | D | E | F | G |
|---|---|---|---|---|---|---|---|---|
| 1 | 0 | 0.001 | −0.015 | 0.019 | −0.017 | — | — | — |
| 2 | 0 | −0.049 | 0.136 | −0.16 | 0.052 | — | — | — |
| 3 | 0 | −0.176 | 0.351 | −0.358 | 0.147 | −0.009 | — | — |
| 4 | 0 | −0.19 | 0.294 | −0.241 | 0.087 | — | — | — |
| 5 | 0 | −0.097 | 0.045 | −0.004 | −0.013 | — | — | — |
| 6 | 0 | −0.033 | 0.041 | −0.021 | 0.001 | — | — | — |
| 7 | 0 | −0.018 | −0.001 | 0.002 | 0.001 | — | — | — |
| 8 | 0 | −0.025 | 0.003 | −0.001 | — | — | — | — |
| 9 | −7.32 | −0.047 | 0.05 | −0.033 | 0.012 | −0.002 | — | — |
| 10 | −3.645 | −0.096 | 0.063 | −0.033 | 0.011 | −0.001 | — | — |
| 11 | 0 | −0.041 | −0.003 | 0.004 | −0.001 | — | — | — |
| 12 | −6.137 | −0.043 | 0.009 | −0.002 | — | — | — | — |

$$Z = CR^2/(1+(1+K)C^2R^2(^{1/2})) + AR^4 + BR^6 + CR^8 + DR^{10} + ER^{12} + FR^{14} + GR^{16}$$

Z: Sag of surface parallel to optical axis
C: Curvature at vertex of surface
K: Conic constant
A~G: fourth-order, sixth-order, eighth-order, tenth-order, twelfth-order, fourteenth-order, and sixteenth-order of aspheric coefficients, respectively.

It is possible to identify the shape of aspheric surface from the sag of the surface parallel to the optical axis, and then the aberration can be measured based on the aspheric shape and data in the tables.

Figure 2:
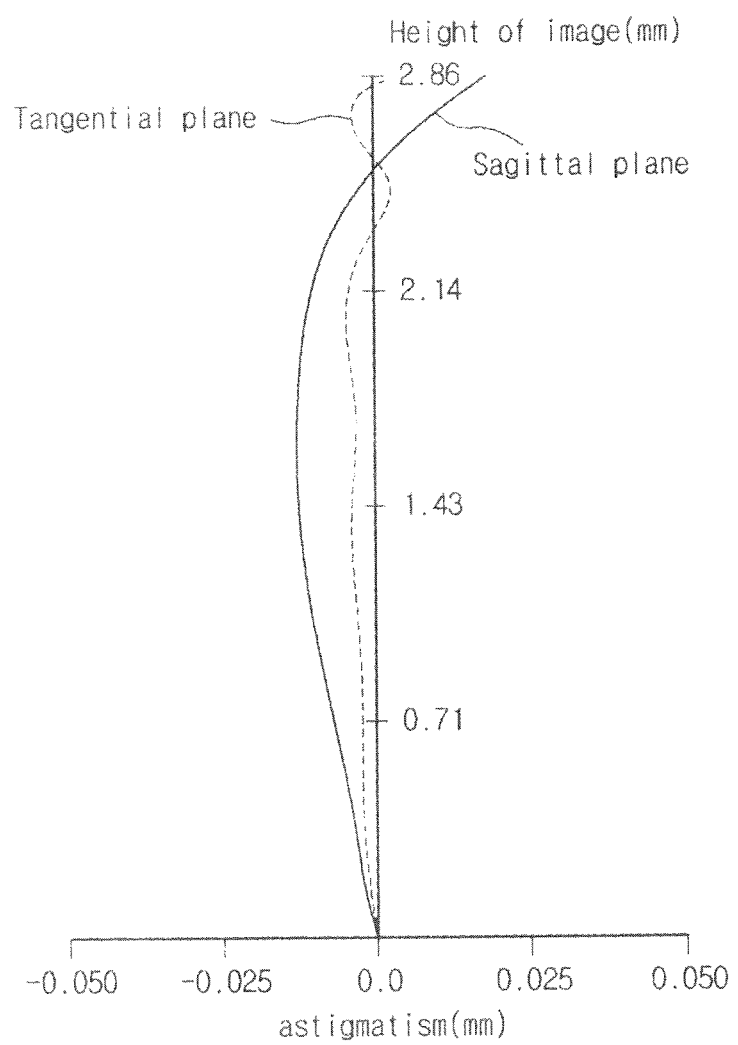
FIG. 2 is a graph showing astigmatism of the lens module according to the first embodiment of the present invention.
Figure 3:
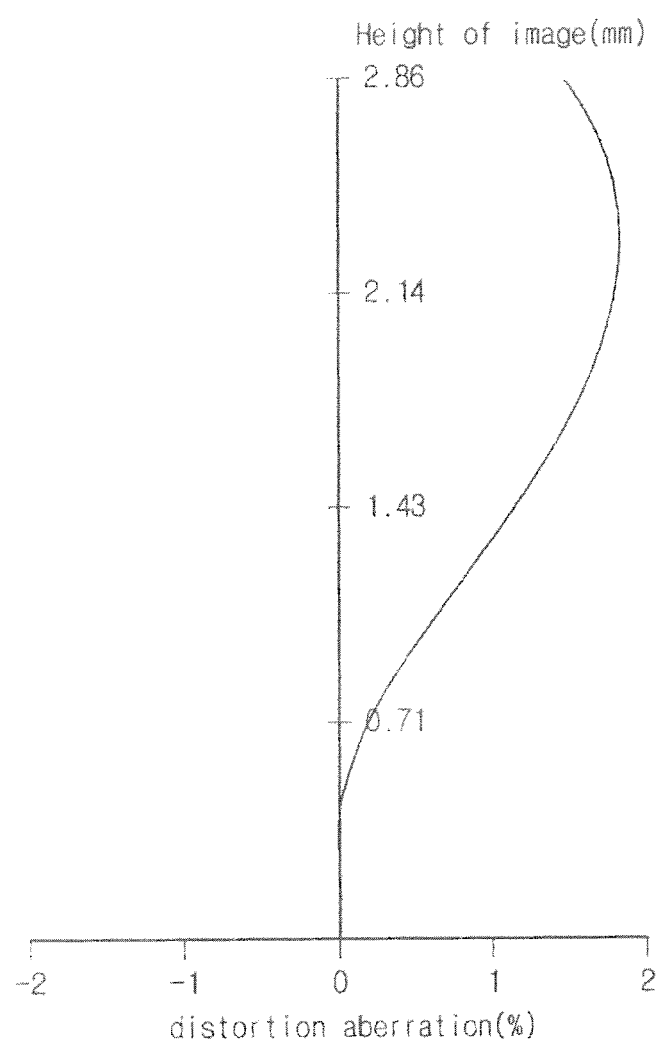
FIG. 3 is a graphs showing distortion of the lens module according to the first embodiment of the present invention.

FIGS. 2 and 3 are graphs showing aberration according to the first embodiment, in which astigmatism and distortion are measured. FIG. 2 is a graph showing astigmatism measured in accordance with the first embodiment of the present invention.

In FIG. 2, the Y axis represents the height (mm) of an image, and the X axis represents astigmatism (mm). In FIG. 2, it is interpreted that aberration correction is better when curves get closer to the Y axis. Astigmatism is an aberration that arises when an optical system has different optical strengths for two orthogonal lights, and is constituted with a tangential plane and a sagittal plane. Between the two lights, the one that passes the optical axis is referred to as the tangential plane, and the other that does not pass the optical axis is referred to as the sagittal plane. In the graphs, since values of images appear to be close to the Y axis, it shows that the astigmatism correction is good.

Figure 4:
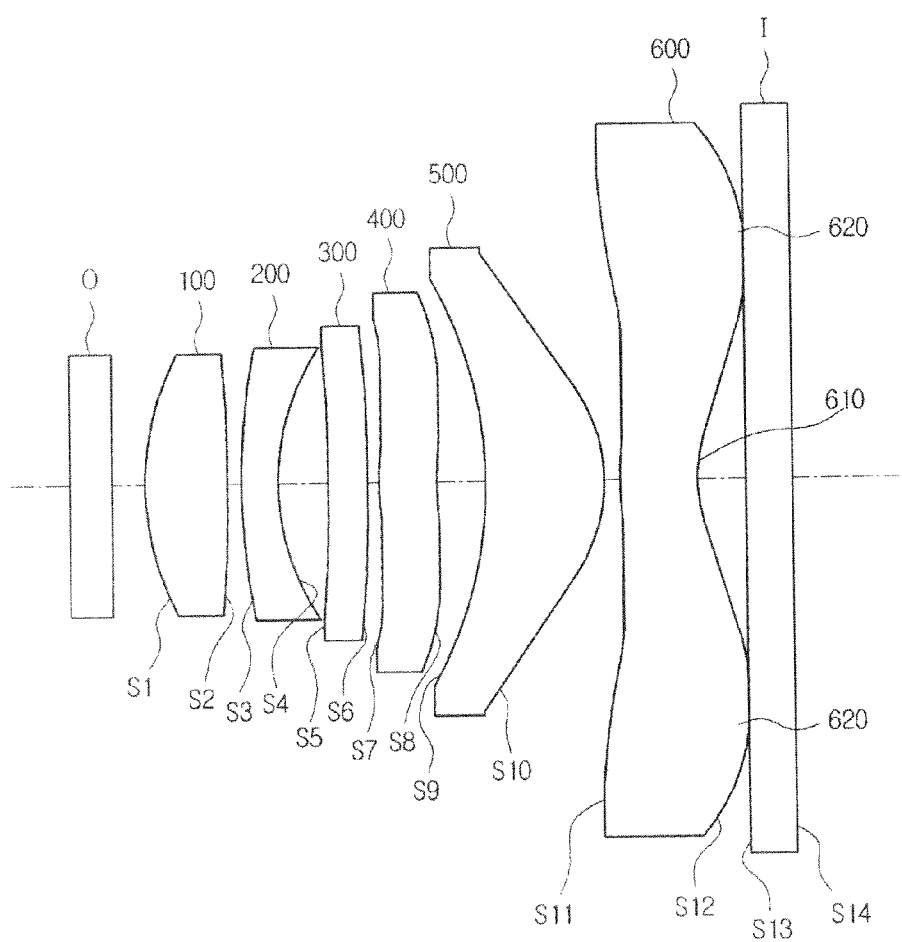
FIG. 4 is a brief illustration of a lens module according to a second embodiment of the present invention.

FIG. 3 is a graph showing distortion that is measured in the first embodiment. In FIG. 3, the Y axis represents the height (mm) of an image, and the X axis represents the distortion (%). In FIG. 3, it is interpreted that aberration correction is better when curves get closer to the Y axis. In the graphs, since values of images appear to be close to the Y axis (i.e., the distortion is formed to be 2% or less), it shows that the distortion correction is good. Similarly, in the second embodiment and the third embodiment, it can be understood that the distortion correction is good. FIG. 4 is a brief illustration of a lens module according to the second embodiment of the present invention.

Referring to Table 3 and FIG. 4, curvature radii of S5, S6, and S8 of the lens module according to the second embodiment of the present invention have positive values, respectively, and thus are somewhat different from the negative curvature radii of S5, S6, and S8 of the lens module according to the first embodiment. Nevertheless, similarly to the lens module according to the first embodiment, the lens module according to the second embodiment of the present invention is also constituted with a lens having one or two aspheric surfaces. In addition, similarly to the lens module according to the first embodiment, the composite refractive index of the first sub-lens 300, the second sub-lens 400, and the third sub-lens 500, which constitute the third lens, has a positive value.

Figure 5:
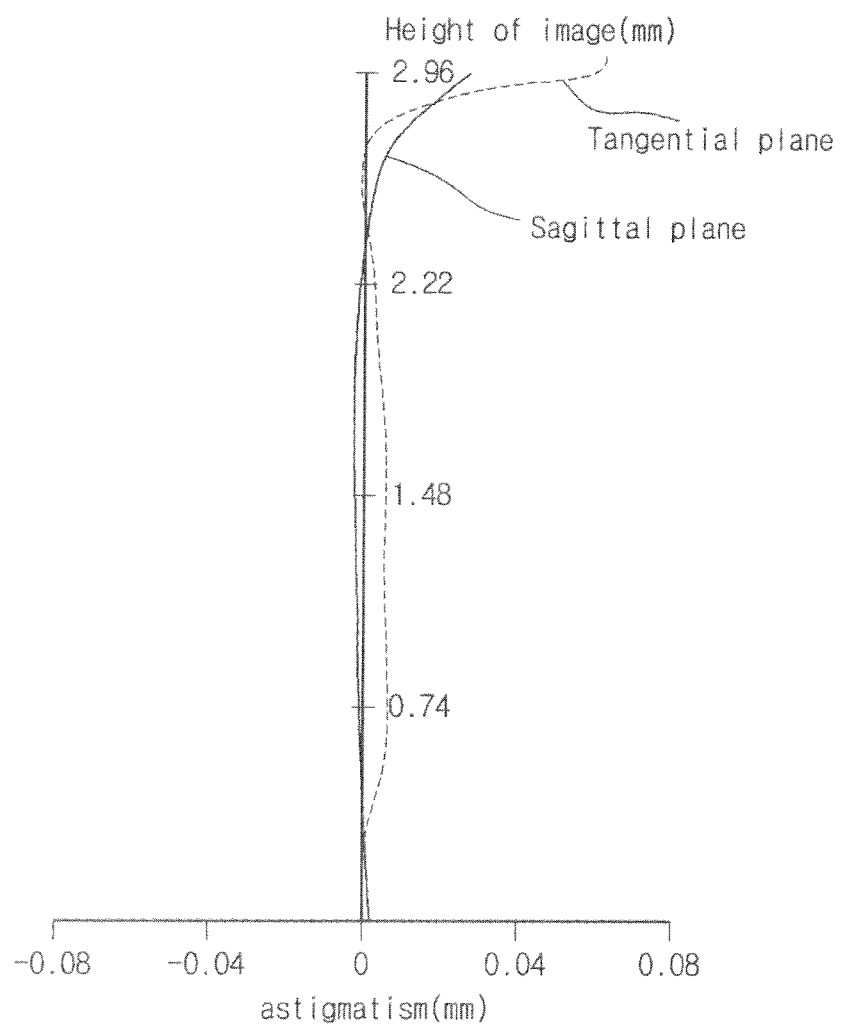
FIG. 5 is a graph showing astigmatism of the lens module according to the second embodiment of the present invention.
Figure 6:
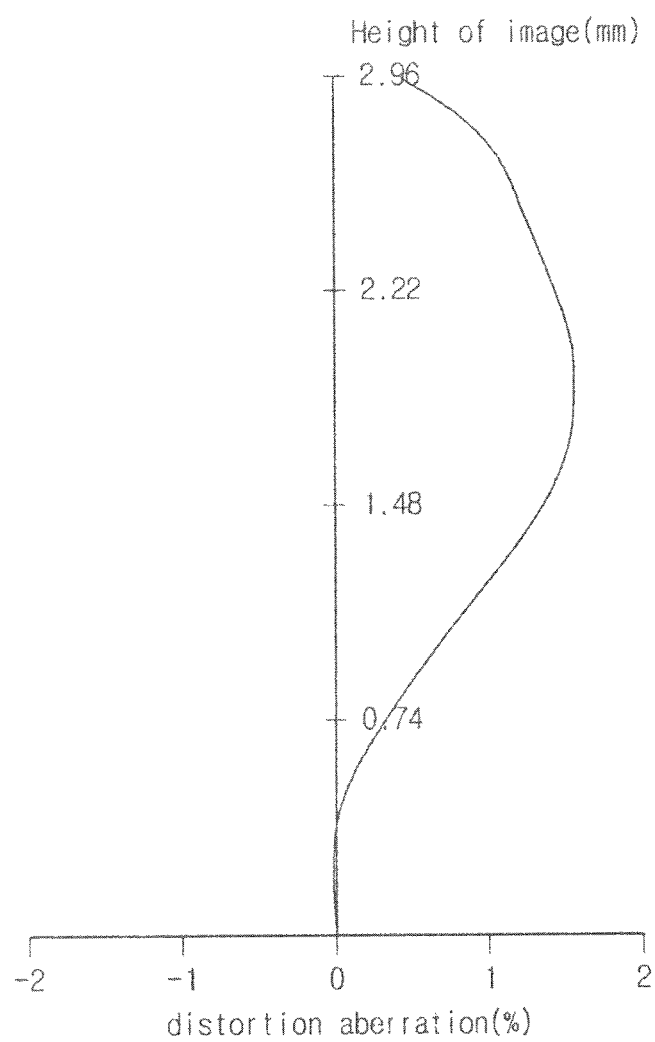
FIG. 6 is a graph showing distortion of the lens module according to the second embodiment of the present invention.

FIGS. 5 and 6 are graphs showing aberration according to the second embodiment, and FIG. 5 is a graph showing astigmatism measured in accordance with the second embodiment.

FIG. 6 is a graph showing distortion measured in accordance with the second embodiment.

The second embodiment is slightly different from the first embodiment in their specifications and aspheric surface coefficients, but, as it can be seen in FIG. 5, the values of images for the astigmatism appear to be close to the Y axis, similarly to the first embodiment, and thus it can be understood that the aberration correction is also good in the second embodiment. Also, as it can be seen in FIG. 6, the values of images for the distortion appear to be close to the Y axis, similarly to the first embodiment, it can be understood that the aberration correction is also good in the second embodiment.

Figure 7:
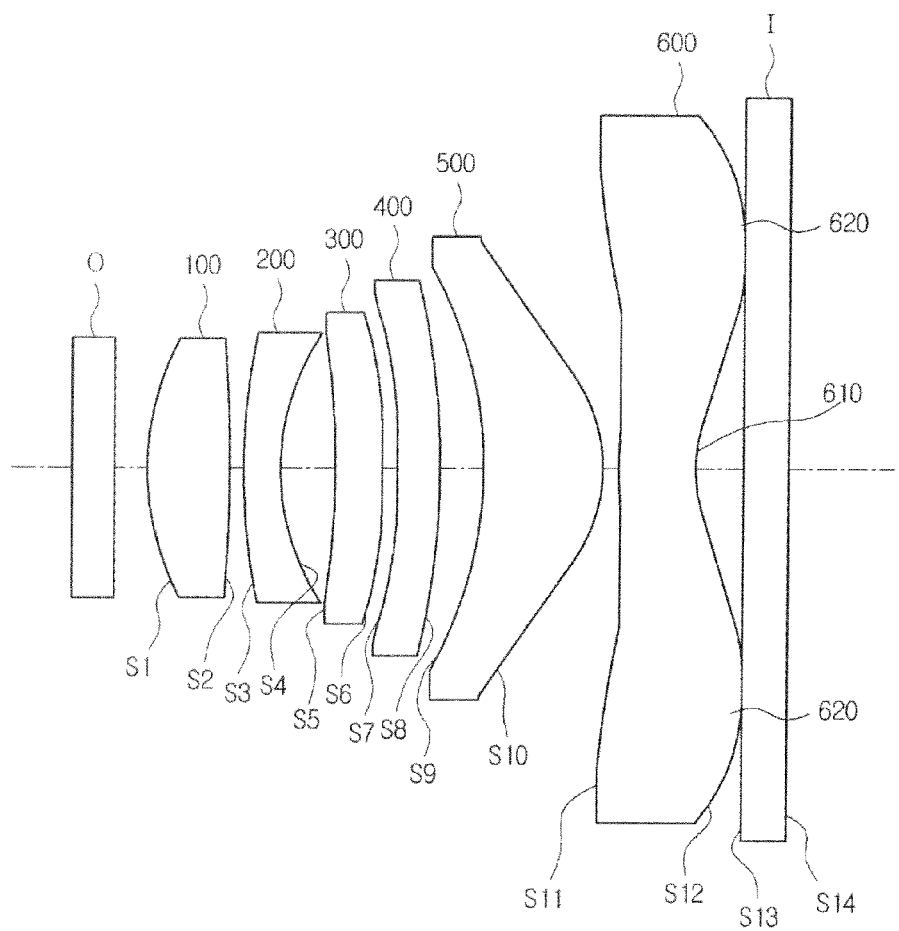
FIG. 7 is a brief illustration of a lens module according to a third embodiment of the present invention.

FIG. 7 is a brief illustration of a lens module according to the third embodiment of the present invention. Referring to Table 5 and FIG. 7, curvature radii of S5 through S10 of the lens module according to the third embodiment have negative values, respectively, and are different from those of the lens modules according to the first and the second embodiments. Nevertheless, similarly to the lens modules according to the first and the second embodiments, the third module in accordance with the third embodiment is also constituted with a lens having one or two aspheric surfaces. In addition, similarly to the lens modules according to the first and the second embodiments, the composite refractive index of the first sub-lens 300, the second sub-lens 400, and the third sub-lens 500, which constitute the third lens, has a positive value.

FIGS. 8 and 9 are graphs showing aberration according to the third embodiment, and FIG. 8 is a graph showing astigmatism that is measured in accordance with the third embodiment.

FIG. 9 is a graph showing distortion that is measured in accordance with the third embodiment.

The third embodiment is somewhat different from the first and the second embodiments in their specifications and aspheric surface coefficients, but, as it can be seen in FIG. 8, the values of images for the astigmatism appear to be close to the Y axis, similarly to the first and the second embodiments, and thus it can be understood that the aberration correction is also good in the second embodiment. Also, as it can be seen in FIG. 9, values of images for the distortion appear to be close to the Y axis, similarly to the first and the second embodiments, it can be understood that the aberration correction is also good in the third embodiment.

The embodiments described above include a wide variety of forms. Although it is not possible to describe all possible combinations to illustrate the variety of forms, it shall be appreciated by those who are ordinarily skilled in the art to which the present invention pertains that other combinations are possible. Therefore, it shall be appreciated that the present invention encompasses all other substitutions, modifications and permutations that belong to the claims appended below.

What is claimed is:

1. A lens module, comprising a first lens, a second lens, a third lens, and a fourth lens that are successively arranged in the direction from an object side to an imaging surface,
    wherein the first lens has a positive refractive index,
    wherein the second lens has a negative refractive index,
    wherein the third lens has a positive refractive index,
    wherein the fourth lens has a negative refractive index,
    wherein the third lens comprises a first sub-lens that has a positive refractive index, a second sub-lens that has a positive refractive index, and a third sub-lens that has a positive refractive index,
    wherein the fourth lens comprises a center portion surrounding an optical axis and a peripheral portion surrounding the center portion,
    wherein the center portion on the imaging surface side is formed in a concave shape, and the peripheral portion on the imaging surface side is formed in a convex shape,
    wherein both surfaces of the first lens are convex,
    wherein an object side surface of the second lens is convex, and
    wherein both surfaces of the second sub-lens are convex.

2. The lens module of claim 1, satisfying $(f_3/f)<1.0$, whereas f is an overall focal length of the lens module, and $f_3$ is a composite focal length of the first sub-lens, the second sub-lens and the third sub-lens.

3. The lens module of claim 1, satisfying $(f_1/f)<1.5$, whereas f is an overall focal length of the lens module, and $f_1$ is a focal length of the first lens.

4. The lens module of claim 1, wherein at least one of the first lens through the fourth lens has one or two aspheric surfaces.

5. The lens module of claim 1, satisfying $20<V_1-V_2<60$, whereas $V_1$ is an Abbe value of the first lens, and $V_2$ is an Abbe value of the second lens.

6. The lens module of claim 1, satisfying $40<V_1<60$ and $20<V_2<30$, whereas $V_1$ is an Abbe value of the first lens, and $V_2$ is an Abbe value of the second lens.

7. The lens module of claim 1, satisfying $1.60<n2<1.80$, whereas n2 is a refractive index of the second lens.

8. The lens module of claim 1, satisfying $1.50<n1<1.70$, whereas n1 is a refractive index of the first lens.

9. The lens module of claim 1, wherein the first lens, the second lens, the third lens, and the fourth lens are made of plastic.

10. The lens module of claim 1, satisfying $(f_1/f_3)>1.0$, whereas $f_1$ is a focal length of the first lens, and $f_3$ is a composite focal length of the first sub-lens, the second sub-lens, and the third sub-lens.

11. The lens module of claim 1, satisfying $(f_{12}/f_3)>2.0$, whereas $f_{12}$ is a composite focal length of the first lens and the second lens, and $f_3$ is a composite focal length of the first sub-lens, the second sub-lens, and the third sub-lens.

12. The lens module of claim 1, satisfying $-2.0<(f_4/f_3)<-0.5$, whereas $f_3$ is a composite focal length of the first sub-lens, the second sub-lens, and the third sub-lens, and $f_4$ is a focal length of the fourth lens.

13. The lens module of claim 1, satisfying $-2.0<(f_2/f_1)<-0.5$, whereas $f_1$ is a focal length of the first lens, and $f_2$ is a focal length of the second lens.

* * * * *